(12) United States Patent
Sakamoto et al.

(10) Patent No.: US 7,347,116 B2
(45) Date of Patent: Mar. 25, 2008

(54) AUTOMOBILE, AND CONTROL UNIT AND DRIVING POWER TRAIN SYSTEM FOR THE SAME

(75) Inventors: Hiroyuki Sakamoto, Ibaraki-ken (JP); Masahiko Iabamoto, Ibaraki-ken (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 43 days.

(21) Appl. No.: 10/996,061

(22) Filed: Nov. 24, 2004

(65) Prior Publication Data

US 2005/0145051 A1 Jul. 7, 2005

(30) Foreign Application Priority Data

Nov. 27, 2003 (JP) ............................. 2003-396469

(51) Int. Cl.
*F16H 3/08* (2006.01)
(52) U.S. Cl. .......................................... 74/329; 74/331
(58) Field of Classification Search .................... 477/3, 477/5; 74/335, 329, 331; 180/65.4, 65.2, 180/65.3; 903/909, 910
See application file for complete search history.

(56) References Cited

U.S. PATENT DOCUMENTS

| | | | |
|---|---|---|---|
| 6,558,283 B1 * | 5/2003 | Schnelle ........................ 475/5 |
| 6,666,787 B2 * | 12/2003 | Doepke ........................ 475/5 |
| 7,083,545 B2 * | 8/2006 | Ibamoto et al. ................ 477/5 |
| 7,107,956 B2 * | 9/2006 | McGee et al. ........... 123/179.3 |
| 7,194,926 B2 * | 3/2007 | Sakamoto et al. ............ 74/335 |
| 2003/0069103 A1 * | 4/2003 | Ibamoto et al. ................ 475/5 |
| 2005/0072609 A1 * | 4/2005 | Eisenhardt et al. ......... 180/65.3 |

FOREIGN PATENT DOCUMENTS

| | | |
|---|---|---|
| DE | 199 40 288 C1 | 8/1999 |
| EP | 0 845 618 A2 | 6/1998 |
| JP | 08-232817 | 9/1996 |
| JP | 2003-072403 | 3/2003 |
| JP | 2004-190705 | 7/2004 |

* cited by examiner

*Primary Examiner*—Ha D. Ho
(74) *Attorney, Agent, or Firm*—Crowell & Moring LLP (57) ABSTRACT

A gear box for selecting a gear train arranged between input and output shafts and shifting gears is used as a transmission, and furthermore, a motor 2 is connected to a differential device 111 of the input and output shafts, and a plurality of mesh mechanisms of an input shaft 4 or an assist input shaft 54 are connected, and the motor 2 is driven, thus a generating machinery 1 is started.

6 Claims, 11 Drawing Sheets

| STATUS AT START | | STARTING METHOD |
|---|---|---|
| 1) | START WHEN START SWITCH IS TURNED ON (ON/OFF, ENGINE SPEED) | E—▽—G—G—O, M |
| 2) | START WHEN RANGE IS SWITCHED (RANGE D / RANGE N, ENGINE SPEED) | E—▽—G—G—O, M |
| 3) | START AT START OF MOVEMENT (HIGH ACCELERATOR OPENING) (ACCELERATOR OPENING, ENGINE SPEED, VEHICLE SPEED) | E—▽—G—O, M |
| 4) | START AFTER START OF MOVEMENT (LOW ACCELERATOR OPENING) (ACCELERATOR OPENING, VEHICLE SPEED, ENGINE SPEED) | E—▽—G—O, M |

AUTOMOBILE, AND CONTROL UNIT AND DRIVING POWER TRAIN SYSTEM FOR THE SAME

CLAIM OF PRIORITY

The present application claims priority from Japanese application serial no. 2003-396469, filed on Nov. 27, 2003, the content of which is hereby incorporated by reference into this application.

BACKGROUND OF THE INVENTION

The present invention relates to start of a generating machinery and control of an automobile transmission.

In recent years, from the viewpoint of warming of earth, it has been important to automatically stop a generating machinery at a crossing. However, in a conventional starting dedicated motor (hereinafter referred to as a starter), it is not supposed to frequently start a generating machinery from the stop state at a crossing, so that the durability is degraded every use and there is a possibility of reduction in the starting performance.

On the other hand, a hybrid automobile for executing shifting by combination of a generating machinery and a motor by a differential gear box, efficiently distributing the drive energy and electrical energy of the generating machinery, and moving is highlighted. The hybrid automobile can start the generating machinery by the motor depending on the method of configuration. For example, there is an art available for connecting a generating machinery and two motors (a drive motor and a dynamic motor) via a planetary gear, driving the two motors when the generating machinery is stopped, and starting the generating machinery via the differential gear box by the differential torque thereof. For example, refer to Japanese Laid-Open Patent Publication No. Hei 08-232817. By use of this art, the generating machinery can be started without separately installing a starter.

SUMMARY OF THE INVENTION

However, in the above art, two motors must be driven to start the generating machinery and an energy loss due to an inverter loss is serious. Further, the shifting operation during traveling is performed by the two motors via the differential gear box, so that a similar energy loss is caused.

Therefore, the present invention uses, as a transmission, a gear box for selecting a gear train arranged between input and output shafts and shifting the gear, furthermore connects a motor to a differential gear box of the input and output shafts, engages a plurality of meshes on the input and output shafts, drives the motor, thereby starts the generating machinery. Without installing a starter, a generating machinery can be started at a low energy loss.

DETAILED DESCRIPTION OF THE PREFERRED EMBODIMENTS

Hereinafter, the embodiments relating to the present invention will be explained with reference to the accompanying drawings.

Figure 1:
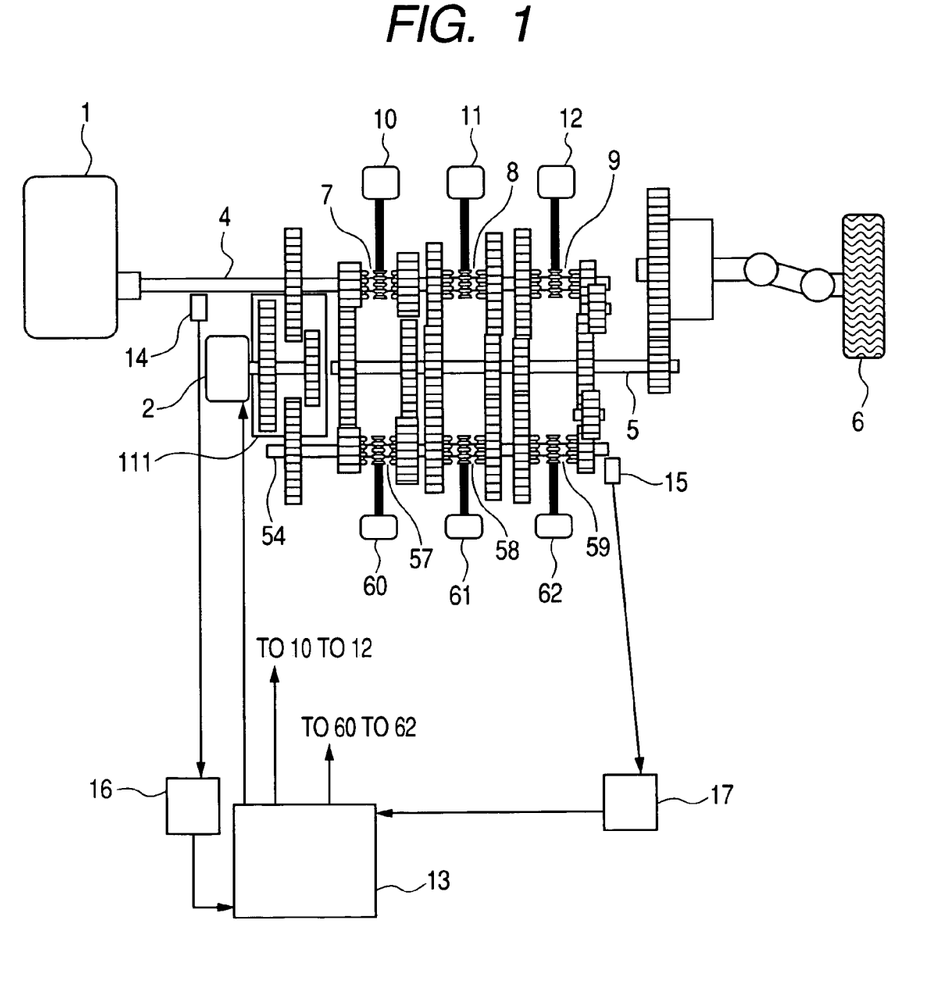
FIG. 1 shows a whole block diagram of the drive system which is an embodiment of the present invention.

FIG. 1 shows the whole constitution of the transmission which is an embodiment of the present invention. The transmission shown in the drawing is a mesh gear type shift mechanism for selecting the arranged gear train between the input and output shaft and shifting the gear.

The rotation of a generating machinery 1 (if it can be used as a generating machinery, the kind thereof is no particular object) is detected by an input shaft rotation sensor 14 via an input shaft 4 and is inputted to an input shaft rotation calculator 16. The rotation of the vehicle shafts is detected by an output shaft rotation sensor 15 via an output shaft 5 and is inputted to an output shaft rotation calculator 17. A start control unit 13, on the basis of output values of a start force calculator (not shown in the drawing), the input shaft rotation calculator 16, and the output shaft rotation calculator 17, executes control of a motor 2 and engagement control of a dog clutch (described later).

A differential device 111 transfers the rotation of the motor 2 to the input shaft 4 and an assist input shaft 54. In this case, the torque transferred is the same for both shafts, so that the composite torque of the generating machinery 1 and the motor 2 is transferred to each gear via the input shaft 4.

A 1-2 shifting dog clutch 7, a 3-4 shifting dog clutch 8, and a 5-R shifting dog clutch 9 which are dog clutches installed on the respective gears of the input shaft are driven respectively by a 1-2 shifting engaging force generator 10, a 3-4 shifting engaging force generator 11, and a 5-R shifting engaging force generator 12.

The torque of the motor 2 is transferred to each gear on the assist input shaft side via the assist input shaft 54. A 0.5-1.5 shifting dog clutch 57, a 2.5-3.5 shifting dog clutch 58, and a 4.5-0.5R shifting dog clutch 59 which are dog clutches installed on the respective gears mounted on the assist input shaft 54 are driven respectively by a 0.5-1.5 shifting engaging force generator 60, a 2.5-3.5 shifting engaging force generator 61, and a 4.5-0.5R shifting engaging force generator 62.

The drive force is transferred to the output shaft 5 by the connected gear of the input shaft 4 and the connected gear of the assist input shaft 54 and drives the wheels.

In this case, for example, when the gears on the side of the assist input shaft 54 are all opened, and the 1-2 shifting dog clutch 7 is connected on the 1st gear side, and the output torque of the motor is 0, the drive force of the generating machinery 1 is transferred to a wheel 6 via the input shaft 4, the 1st gear, and the output shaft 5. Further, for example, when the gears of the input shaft 4 are all opened and the 0.5-1.5 shifting dog clutch 57 is connected on the 0.5th gear side, the torque of the motor 2 is transferred to the wheel 6 via the assist input shaft 54, the 0.5th gear, and the output shaft 5.

At this time, the torque of the motor 2 also acts on the generating machinery 1. After starting of the generating machinery 1, the maximum torque acting on the assist input shaft 54 from the motor 2 is restricted by the torque of the generating machinery 1. At the state of stop of the generating machinery 1, the torque of resistance of revolution of the generating machinery 1 acts on the assist input shaft 54, while the torque acting on the generating machinery 1 is restricted by the inertia torque of the assist input shaft 54.

By use of such a principle, when the assist input shaft 4 is fixed, the inertia torque becomes infinite and the torque of the motor 2 is all applied to the generating machinery 1, so that when torque higher than the resistance torque of the generating machinery 1 is outputted from the motor 2, the generating machinery 1 rotates and can start. Since a plurality of gears are arranged on the assist input shaft 54, when two or more gears are connected, the assist input shaft 54 can be fixed.

When the generating machinery 1 is an internal combustion engine, the torque of resistance of revolution becomes compression torque of the internal combustion engine, so that torque of from 50 Nm to 100 Nm is sufficient. The torque at the time of shifting must accept the maximum torque of the generating machinery 1, so that the motor 2 can easily output the compression torque of the internal combustion engine.

Figure 2A:
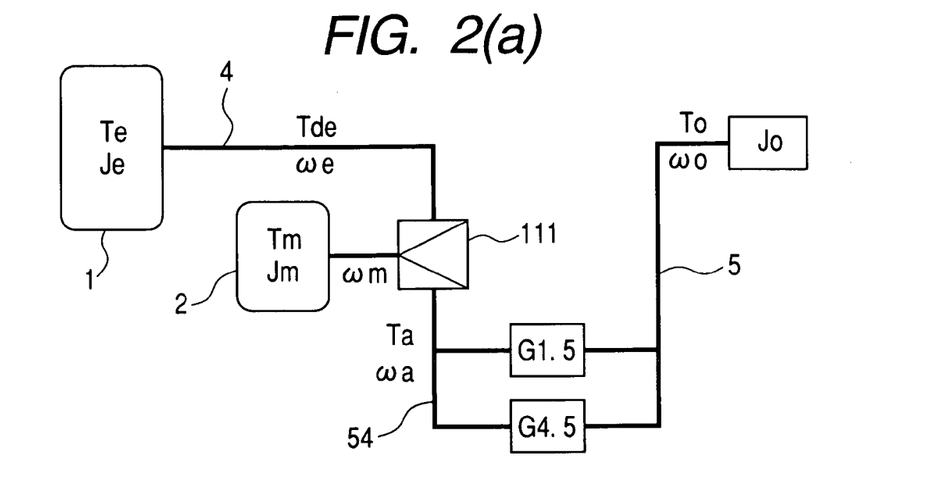
FIG. 2 shows a schematic diagram of the torque transmission path of each start method shown in FIG. 1.

FIG. 2(a) is a schematic diagram of the torque transmission path in this state. The torque Tm outputted from the motor 2 is applied to the input shaft 4 and the assist input shaft 54 via the differential device. The assist input shaft 54 is connected to both the gears G1.5 and G4.5, so that $\omega a$ becomes 0 and the shaft does not rotate. The differential device generates a rotation difference such as $\omega e = \omega m + \omega a$, so that when $\omega a$ is 0, $\omega m$ is $\omega e$. Therefore, the number of rotations $\omega e$ of the rotation shaft of the generating machinery 1, assuming the load torque at the start time as 50 Nm, from the moment of inertia Jm of the motor 2 itself and the moment of inertia Je of the generating machinery, can be calculated by the following formula:

$$\omega e = \omega a = (Tm-50)/(Jm+Je)$$

Therefore, when Tm is more than 50 Nm, the generating machinery 1 starts to rotate and rise and when the number of rotations exceeds the number of start rotations, can rotate by itself. Further, although the gears G1.5 and G4.5 are used here, the present invention is not limited to it and another combination of gears can produce the same effect.

Although the generating machinery 1 can be started by the motor 2 like this, since the output shaft 5 is fixed in this case, the generating machinery 1 can start only in the vehicle stop state. Start from the stop state at a crossing must be executed quickly, so that when time is required for start, the start time becomes longer and an irritable sense of passengers and congestion at a crossing of heavy traffic result.

Therefore, in this system, before the generating machinery 1 starts, the motor 2 starts. For example, when one gear on the side of the input shaft 4 and one gear on the side of the assist input shaft 54 are connected and torque is outputted from the motor 2, since the drive torque of the generating machinery 1 is zero, the torque of the motor 2 is applied to the input shaft 4, is amplified at the connected gear ratio of the input shaft 4, and is transferred to the output shaft 5. On the other hand, the torque of the motor 2 is also applied to the assist input shaft 54, is amplified at the connected gear ratio of the assist input shaft 54, and is transferred to the output shaft 5. At this time, the sum of the torque transferred from the input shaft 4 and the torque transferred from the assist input shaft 54 becomes the final acceleration torque of the output shaft 5.

Figure 2B:
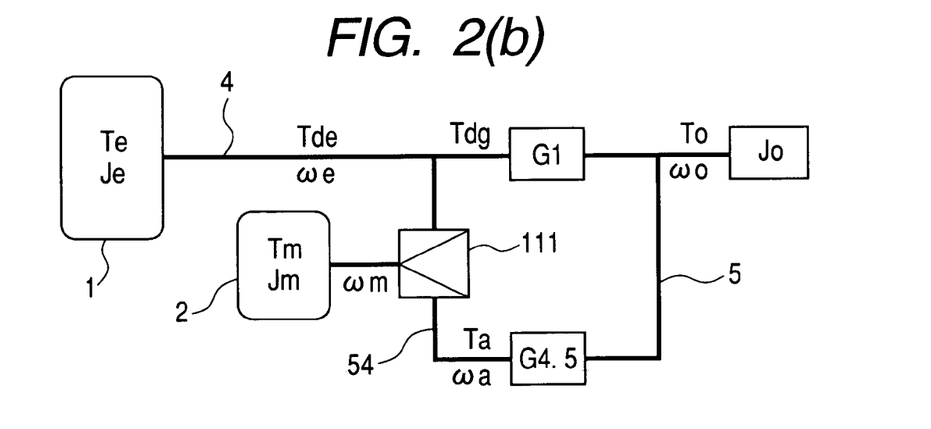

FIG. 2(b) is a schematic diagram of the torque transmission path in this state. The torque Tm outputted from the motor 2 is applied to the input shaft 4 and the assist input shaft 54 via the differential device. In the differential device, the number of rotations is dispersed, while the torque is not dispersed, and if the moment of inertia Jm of the motor 2 is not considered, Tm is applied to the two shafts. At this time, the generating machinery 1 is connected to the input shaft 4, so that it rotates in proportion to rotation and rise of the output shaft. The output shaft torque To at this time, from the torque Tm of the motor 2, the gear ratio G1 of the gears on the side of the input shaft 4, and the gear ratio G4.5 of the gears on the side of the assist input shaft 54, can be calculated by the following formula.

$$To = Tm \times G1 - Tm \times G4.5 = (G1-G4.5) \times Tm$$

Therefore, as the difference between G1 and G2 is increased, the torque transferred to the output shaft 5 is increased.

Here, in consideration of the load torque of the generating machinery 1 at the start time as 50 Nm, the output torque of the motor 2 to obtain the same acceleration is expressed as indicated below.

$$Tm = To/(G1-G4.5)+5.0$$

The number of rotations $\omega o$ of the output shaft 5, assuming the moment of inertia of the vehicle viewed from the output shaft 5 as Jo, is expressed as indicated below.

$$\omega o = To/Jo$$

Therefore, the generating machinery 1 rotates at the number of rotations of:

$$\omega e = \omega o \times G1 = To/Jo \times G1$$

When one gear of the input shaft 4 and one gear of the assist input shaft 54 are connected like this, while driving the vehicle, the generating machinery 1 can be started. Further, here, the gears G1 and G4.5 are used, though another combination of gears can obtain the same effect.

In the aforementioned case, the moment the vehicle starts, the generating machinery 1 also starts. However, when the vehicle starts at an extremely low speed, the generating machinery 1 also starts at a low speed, thus the efficiency is bad. Further, the stop state at a crossing occurs frequently, so that whenever traveling at a short distance, the generating machinery 1 is stopped and started. When the generating machinery 1 is an internal combustion engine, repetition of such start and stop reduces the efficiency and increases fuel expenses.

Therefore, even if the output shaft 5 rotates, the gears of the input shaft 4 are all opened to prevent the generating machinery 1 from rotation and one gear of the assist input shaft 54 is connected. In this state, the torque of the motor 2 acts on the generating machinery 1 and the output shaft 5. However, the moment of inertia of the vehicle is large and the moment of inertia of the generating machinery 1 is small, so that it is considered that only the generating machinery 1 rotates. However, the assist input shaft 54 has gears, so that the torque is amplified by the gears and depending on the gear ratio, the moment of inertia of the vehicle viewed from the motor 2 may be equal to that of the generating machinery 1. Further, when the generating machinery 1 is an internal combustion engine, compression torque is generated, so that if the gear ratio is made larger, the generating machinery 1 does not rotate, and the output shaft 5 rotates, and the vehicle starts. In this state, even if the vehicle starts, the rotation shaft of the generating machinery 1 does not rotate and cannot start. However, the moment the torque of the motor 2 is increased higher than the compression torque, the rotation shaft of the generating machinery 1 starts to rotate. By doing this, when the torque of the motor 2 is changed, while starting the vehicle, the generating machinery 1 can be started at an optional vehicle speed.

Here, the directivity of torque will be discussed. When positive torque is applied to the motor 2, if the number of rotations of the generating machinery 1 is not changed, from $\omega e = \omega m + \omega a$ which is a characteristic of the differential device, negative torque is applied to the output shaft. In this case, the vehicle moves back. However, when the reverse gear is used, the direction of the torque is changed and the vehicle moves forward.

Figure 2C:
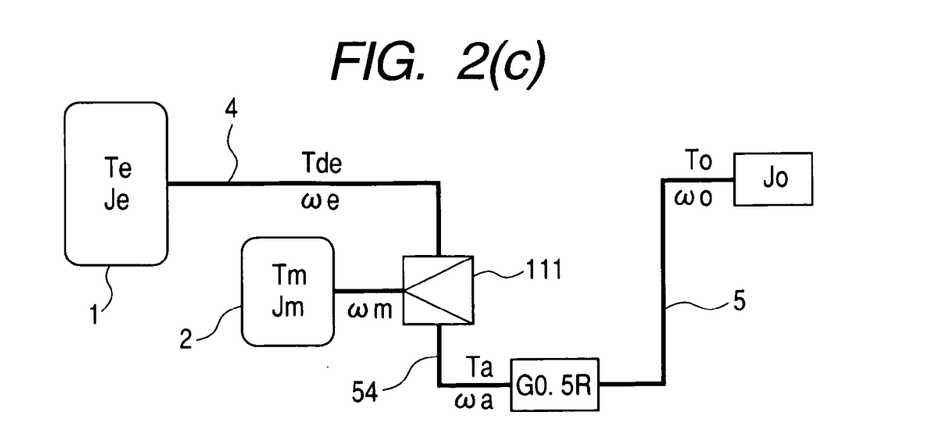

FIG. 2(*c*) is a schematic diagram of the torque transmission path in this state. The torque Tm of the motor 2 acts on the generating machinery 1 via the differential device. When Tm is lower than the compression torque of the generating machinery 1, the generating machinery 1 does not rotate, so that from the viewpoint of the mechanism of the differential device, $\omega e = 0$ and $\omega m = \omega a$, thus by the torque Tm of the motor 2, torque of Tm×G2.5 acts on the output shaft 5 via the assist input shaft 54. Here, assuming the maximum drive torque of the generating machinery 1 as 100 Nm and the compression torque as 50 Nm, up to 50% of the maximum acceleration of the vehicle can be obtained. In starting at a general crossing, fully open acceleration is hardly carried out, so that there are no particular problems imposed for practical use. When the output shaft 5 reaches an optional speed after starting of the vehicle, if torque larger than the compression torque is applied, the generating machinery 1 starts rotation. As mentioned above, the generating machinery 1 can start at an optional speed during traveling of the vehicle, and at a short distance in an urban district, the vehicle travels by the motor 2, and there is no need to frequently start and stop the generating machinery 1.

The principle of start after starting by the reverse gear is described above. However, the forward gear is also available. When the motor 2 outputs negative torque, the vehicle moves forward. Therefore, on the generating machinery 1, negative torque, that is, torque for reducing the number of rotations acts, and the generating machinery 1 rotates reversely, though it does not rotate and rise within the range of the load torque.

Therefore, before the vehicle rises up to a fixed vehicle speed, the vehicle starts at negative low torque and when the vehicle reaches the fixed vehicle speed, torque is instantaneously applied in the positive direction. The vehicle is applied with negative torque, though high torque is instantaneously applied, thus energy is used for rotation and rise of the generating machinery 1, and the deceleration of the vehicle is low. For example, when the moment of inertia of the generating machinery 1 is set to 0.15 and torque of 200 Nm is applied to the motor 2, the time required for the number of rotations to reach 1000 [r/min] which is the number of rotations at the time of start completion is less than 0.1 s. Considering the load torque and the moment of inertia of the motor 2 itself, the start is completed within 0.1 s to 0.2 s. When the moment of inertia of the vehicle is about 3, the rotation of the output shaft 5 is changed by about 30 [r/min]. Therefore, when the vehicle starts at the number of about 500 [r/min] of the output shaft 5, the variation can be suppressed to about 6%. Further, at the point of time when the torque is changed from negative to positive, when the generating machinery 1 is an internal combustion engine, the piston is compressed from the expansion side. Therefore, the compressed part of the torque is applied in the same direction as that of the start torque of the internal combustion engine, and the moment of inertia of the internal combustion engine is more reduced by this energy, and the time up to start completion is more shortened.

Figure 3:
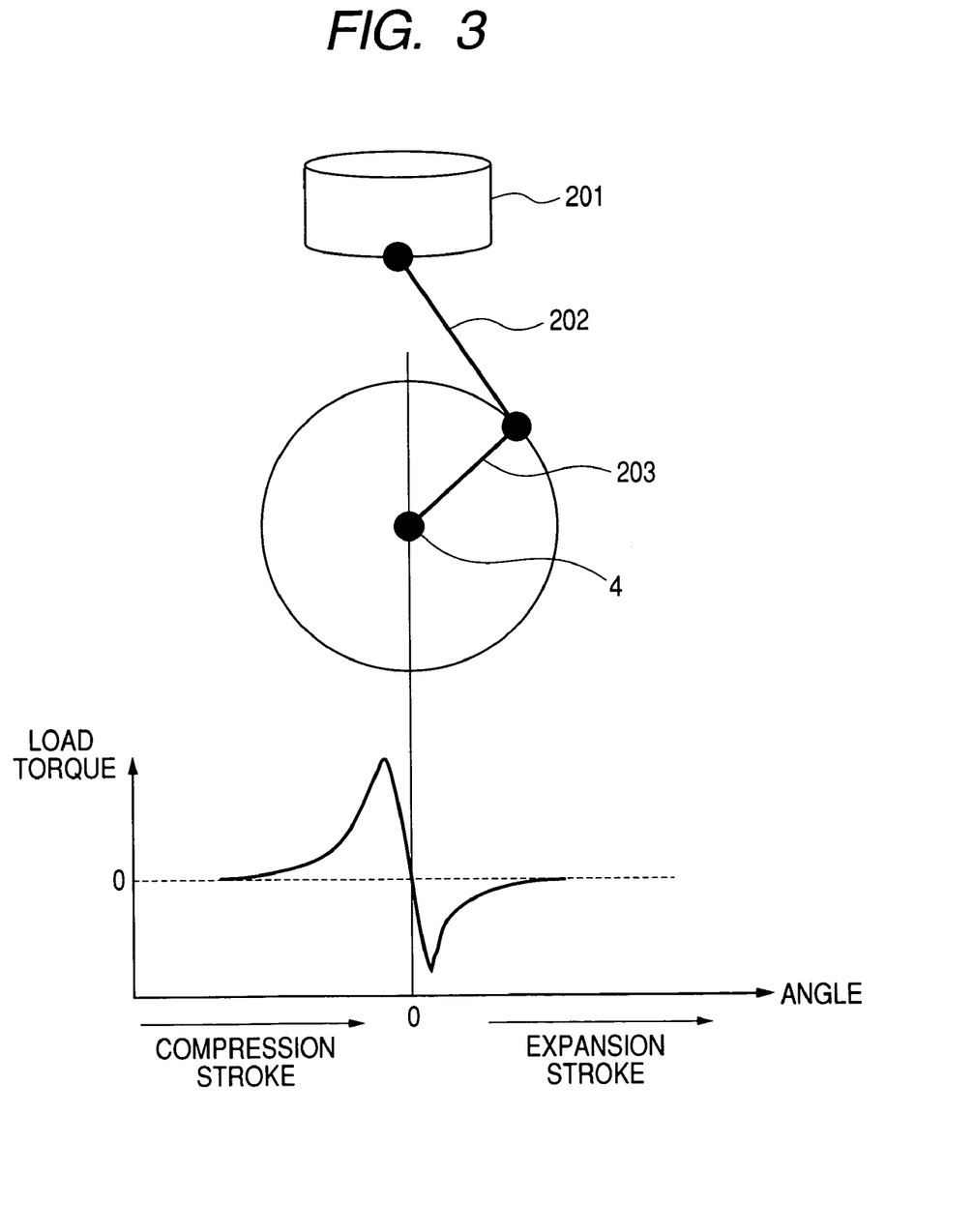
FIG. 3 shows the internal constitution of the internal combustion engine shown in FIG. 1 and a change drawing of the rotation load torque.

When the generating machinery 1 is an internal combustion engine, it is described above that compression torque is generated. The torque, at the time of expansion after compression, is discharged as output from the internal combustion engine. FIG. 3 shows load torque changes of a general internal combustion engine. The torque acting on the input shaft 4 by a piston 201, a cone rod 202, and the radius of a rotation shaft 203 of the crank is changed as shown in the drawing. This variation results in forward and backward accelerations of the vehicle and generates vibration.

Therefore, when the changed part of the torque is added to the traveling torque of the motor 2 as compensation torque, changes in the acceleration of the vehicle due to pulsation of the internal combustion engine can be suppressed. FIG. 4 shows changing number of revolutions by the torque Tm of the motor 2 with the compensation torque added.

Figure 4A:
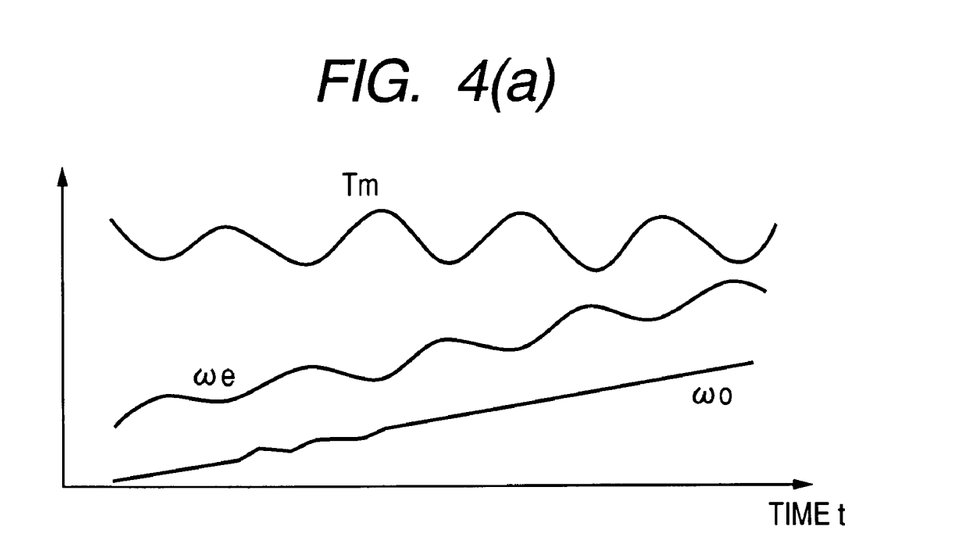
FIG. 4 shows start torque waveforms corresponding to the torque changes shown in FIG. 1.

FIG. 4(*a*) shows a waveform when one gear of the input shaft 4 and one gear of the assist input shaft 54 are connected and the generating machinery 1 is started after starting of the vehicle. The torque of the motor 2 is changed, thus the changing number of revolutions of the motor 2 and the changing number of revolutions of the generating machinery 1 cancel each other and the change of the number of rotations $\omega o$ of the output shaft 5 is reduced.

Figure 4B:
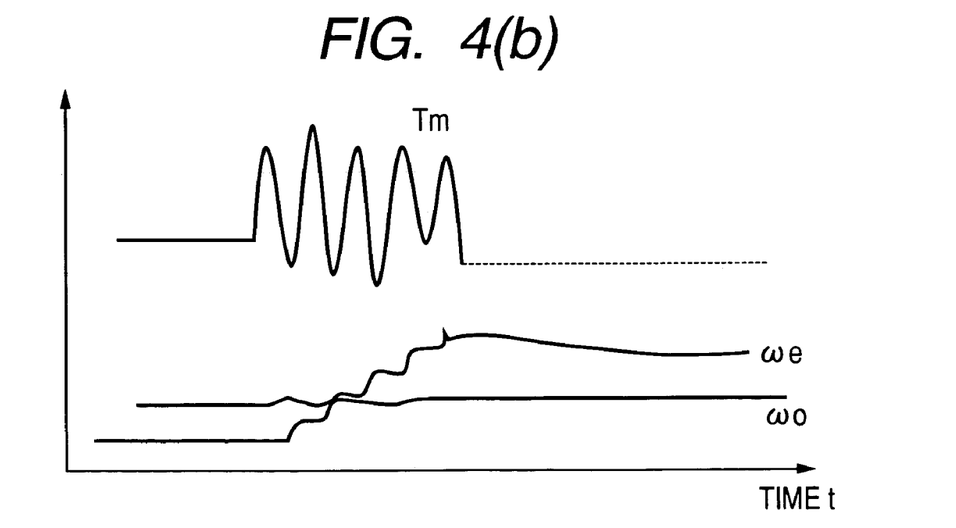

FIG. 4(*b*) shows a waveform when only one gear of the assist input shaft 54 is connected and the generating machinery 1 is started after starting of the vehicle. In this case, start torque is generated after the vehicle rises up to a fixed speed, so that the drawing shows that the change of the number of rotations $\omega o$ of the output shaft 5 is slow. The torque change, since the output shaft speed is high, is high frequency waves. Further, in a state that the gears of the input shaft 4 are all opened, and two gears of the assist input shaft 54 are connected, and the generating machinery 1 is started when the vehicle is stopped, since the output shaft is fixed, the vehicle body does not vibrate back and forth. Therefore, there is no need to add the compensation torque as mentioned above, though even if the compensation torque is added, there are no problems imposed.

Further, the internal combustion engine generates explosion force in correspondence to combustion of fuel. At this time, instantaneous torque is also added to the output shaft 4. Therefore, when the supply of fuel is reduced until the number of rotations of the internal combustion engine increases to a certain extent, the shock can be reduced. When the number of rotations is increased, the difference between the expansion speed at the time of explosion and the descending speed of the piston is reduced, and the torque is increased continuously, so that when the motor 2 is reduced by fixed torque, there are no problems imposed.

Figure 5:
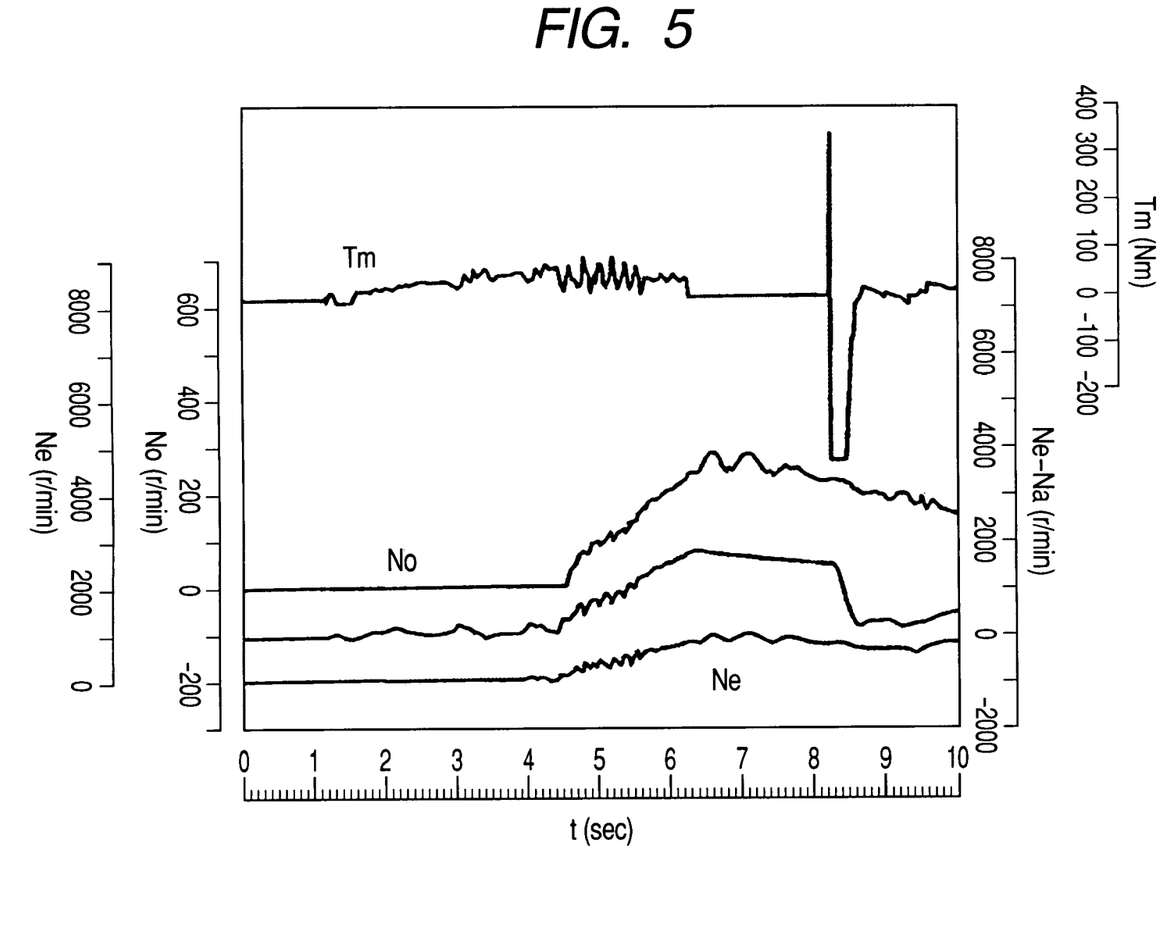
FIG. 5 shows the actual torque at the time of start and speed change waveforms.

Experimental results when the generating machinery 1 is started in a state that one gear of the input shaft 4 and one gear of the assist input shaft 54 are connected are shown in FIG. 5. It is found that as the number of rotations No of the output shaft 5 is increased, the number of rotations Ne of the generating machinery 1 is increased. Here, Ne [r/min]=ωe [rad/s]/6.28×60 and No=ωo [rad/s]/6.28×60.

As described above, the generating machinery 1 can be started by the three methods. When the three methods are switched as shown in FIG. 6, the generating machinery 1 can be started in correspondence with various operation statuses.

Figure 6:
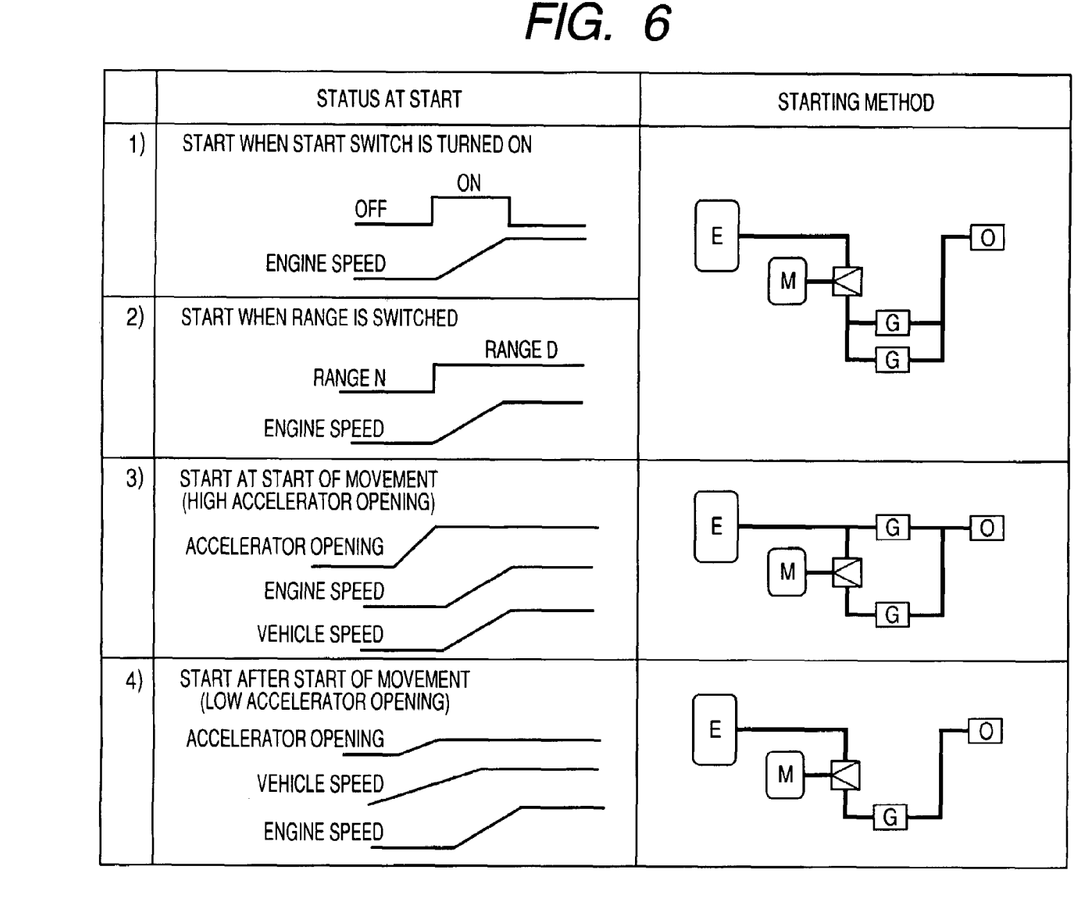
FIG. 6 shows correspondence between the start decision status and the start method shown in FIG. 1.

In 1) and 2) shown in FIG. 6, by use of a drive range detected by a key SW called a START switch 304 provided in almost every automobile or by use of a drive range switching shift lever 302 and a drive range detector 305, the starting operation can be realized.

In 1), this switch, generally when the vehicle is stopped, is used to optionally start the generating machinery 1 by a driver. Therefore, when using the switch, the vehicle is stopped, so that the output shaft 5 is fixed by the method shown in FIG. 2(*a*) and the generating machinery 1 can be started.

As in 2), when switching the drive range from the neutral range (N range) to the drive range (D range), the vehicle is stopped in many cases, so that the same method as that in 1) can be adopted.

When using the method shown in FIG. 2(*a*), stop of the vehicle and stop of the generating machinery 1 must be confirmed. Therefore, for example, in 1), a decision is given under the condition of vehicle speed<vehicle stop decision speed, number of revolutions of generating machinery 1<rotation shaft stop decision speed, and START switch=ON.

In 2), when the brake is on, the vehicle may not be started, so that a brake detector 301 is installed and a decision is given under the condition of brake SW=ON, vehicle speed<vehicle stop decision speed, number of revolutions of generating machinery 1<rotation shaft stop decision speed, and range=N→D or N→R. Further, when brake SW=ON is changed to OFF, there is an instant time for stepping change before accelerator ON, so that the generating machinery 1 may start at this time.

During stopping of the generating machinery 1 at a crossing, a case that a driver does not find stopping or a case that he wants to start soon when the signal is turned to blue is conceivable, so that the operation for starting is hardly performed by the driver. In such a case, the method shown in FIG. 2(*b*) or FIG. 2(*c*) can be effectively used. In FIG. 2(*b*), the moment the driver steps on the accelerator as shown in 3) in FIG. 6, the vehicle can be started and the rotation axis of the generating machinery 1 can start the moment the rotation is started. When the accelerator pedal position is shallow, the start acceleration torque of the vehicle must be reduced, and the ratio of the compression torque of the generating machinery 1 to pulsation is increased, so that there is a possibility of feeling vibration. Therefore, when the accelerator pedal position is shallow, the method shown in FIG. 2(*c*) is preferably used.

When the method shown in FIG. 2(*c*) is used when the accelerator pedal position is deep, the generating machinery 1 is started when the torque is higher than the compression torque of the generating machinery 1. However, due to the characteristic of the differential device, the rotation shaft of the generating machinery 1 moves up, thus the vehicle may not be accelerated. This problem can be solved if there is a device for fixing the rotation shaft of the generating machinery 1 so as to prevent it from rotation. For example, there is a method available for fixing the rotation shaft using a friction material for it. Therefore, by use of such a device, only by the method shown in FIG. 2(*c*), the vehicle can start at a high accelerator opening. In the method shown in FIG. 2(*c*), the same may be said with a case of use of the forward gear. At this time, the rotation shaft may not be rotated inversely, so that instead of a friction material, a reverse rotation preventive mechanism of a ratchet method may be used. Further, assuming the angle for stopping rotation by the ratchet mechanism, when an internal combustion engine is used, as the neighborhood of the top dead center of compression of the expansion stroke, the compression torque at the time of reverse rotation can be used as positive torque at the start time, so that the efficiency is improved.

Further, at a low accelerator opening, as described in Japanese Patent Application 2001-311688 filed earlier by the same applicant, when the clutch is installed, by the method shown in FIG. 2(*b*), the generating machinery 1 can be started. By use of this constitution, when the clutch is kept separated, the vehicle can be started by the motor 2 and when the vehicle reaches a fixed vehicle speed, the clutch is connected. When the clutch is a friction clutch, by the engaging force of the clutch, the torque for starting the generating machinery 1 can be changed, so that the start torque is slowly increased, and the torque necessary for starting is added to the motor 2, thus the generating machinery 1 can be started at a low accelerator opening without changing the acceleration of the vehicle.

When such a device is not installed, in FIG. 2(*b*), as shown in 3) of FIG. 6, it is desirable to set decision conditions of accelerator pedal position>stepping decision value and number of revolutions of generating machinery 1<rotation shaft stop decision speed. Further, in FIG. 2(*c*), the generating machinery 1 can start at a fixed vehicle speed or higher, so that the conditions of accelerator pedal position>stepping decision value, number of revolutions of generating machinery 1<rotation shaft stop decision speed, and vehicle speed>starting vehicle speed decision value can be added. These conditions, since the mutual realization conditions do not interfere with each other, can be all used as coexistent functions. When the generating machinery 1, which is not started, is started under any of the aforementioned conditions, the vehicle can be started effectively and quickly.

Figure 7:
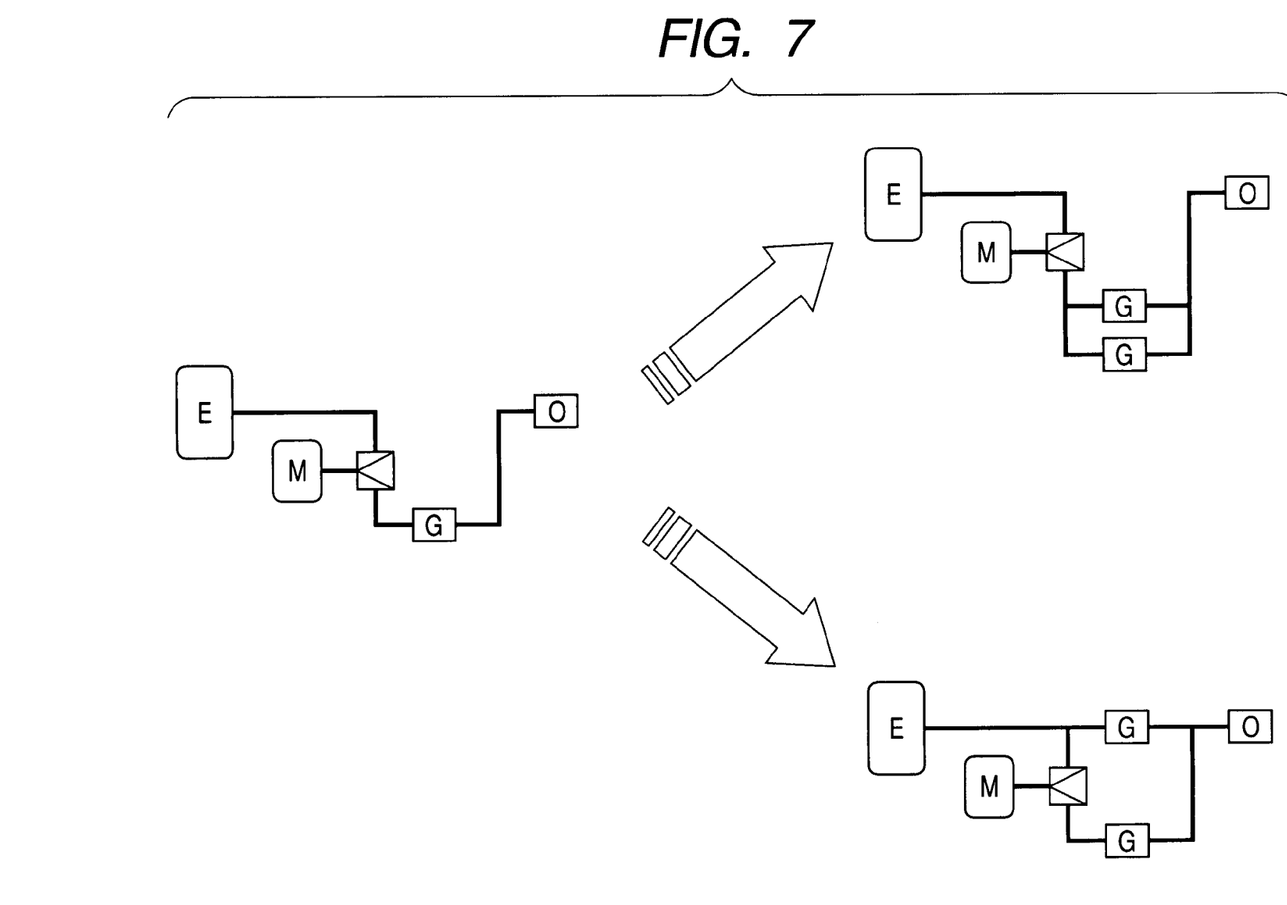
FIG. 7 shows a transition diagram of the gear engagement status shown in FIG. 1.

In (a) and (b) of FIG. 2, two kinds of gears are connected, so that care must be taken. For example, when the output shaft rotation sensor 15 is out of order and zero is indicated, the vehicle speed exists actually, thus it is dangerous to engage two gears of the assist input shaft 54 and it causes a shock to engage the gears of the input shaft 4. And, as shown in FIG. 7, when only one gear of the assist input shaft 54 is connected first and the number of rotations of the motor is monitored, the output shaft rotation sensor 15 can observe the number of rotations of the motor and a proportional number of rotations by the connected gear, so that the output shaft rotation sensor 15 can perform normal decision. When the second gear is connected after the normal decision, the safety is greatly improved.

Furthermore, to strictly perform the aforementioned condition decision, only when the conditions are continued for a fixed time, a start instruction is outputted more safely.

Figure 8:
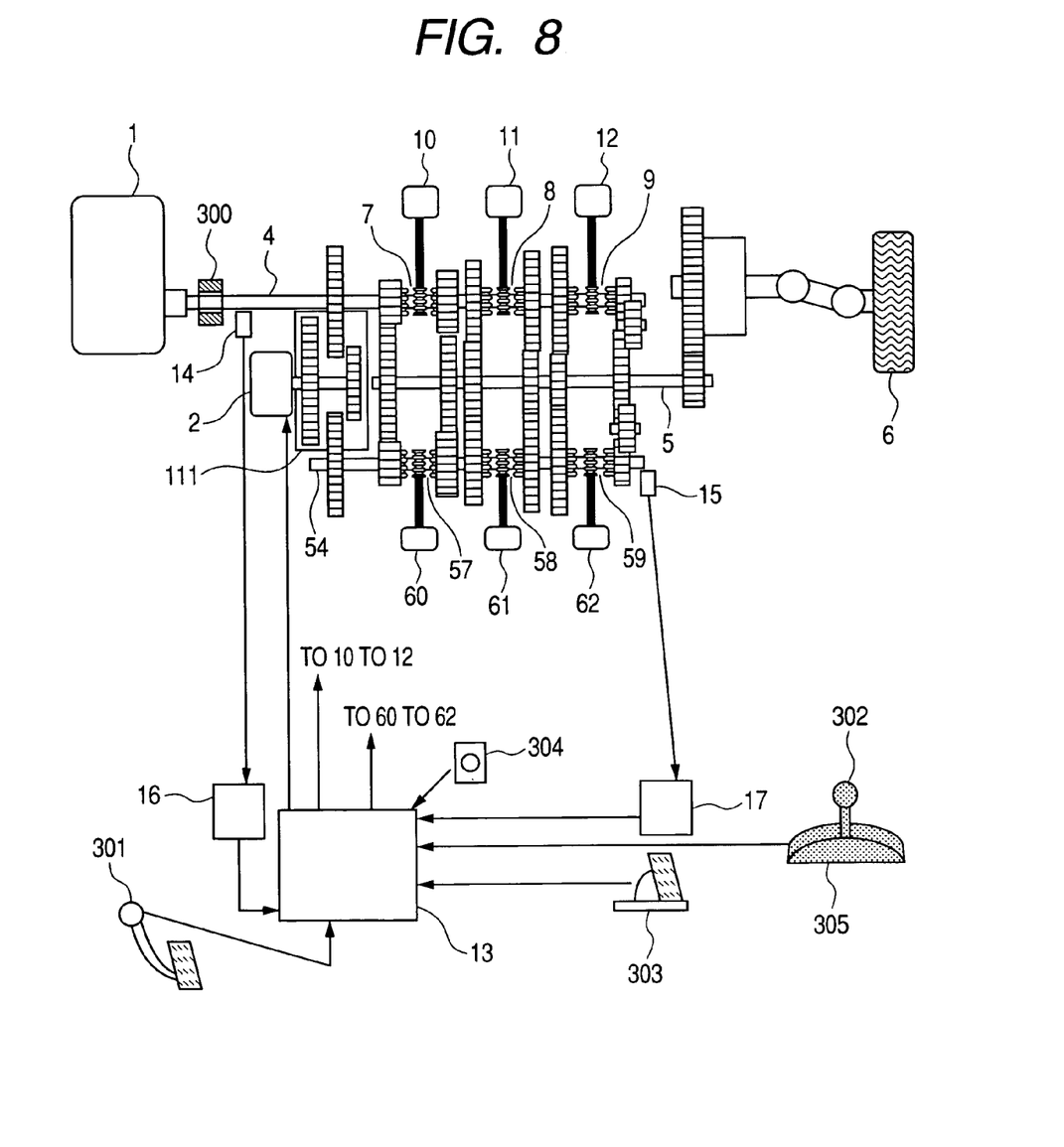
FIG. 8 shows a schematic diagram when the start condition judgment device shown in FIG. 1 is loaded.

FIG. 8 shows a constitution when such condition decision is performed. To FIG. 1, a rotation stop device 300, a brake detector 301, a drive range switching shift lever 302, an accelerator opening sensor 303, a START switch 304, and a drive range detector 305 are added. Signals of these devices are fetched by the start control unit 13 and values of the torque of the motor 2, gear engagement of the input shaft 4, and gear engagement of the assist input shaft 54 are calculated and are outputted as instruction values. By doing this, the starting method can be switched and starting by the method by switching decision results can be realized. Here, the rotation stop device 300 withstanding a high accelerator opening by the method shown in FIG. 2(c) is described. However, as mentioned above, the latch mechanism is acceptable and when a clutch capable of separating the rotation shaft is installed, the problem of a low accelerator opening can be solved by the method shown in FIG. 2(b). Further, the rotation stop device 300 is desirably controlled by a start control unit. However, if another device can stop rotation for a fixed time at the state of stop, there are no problems imposed.

Figure 9:
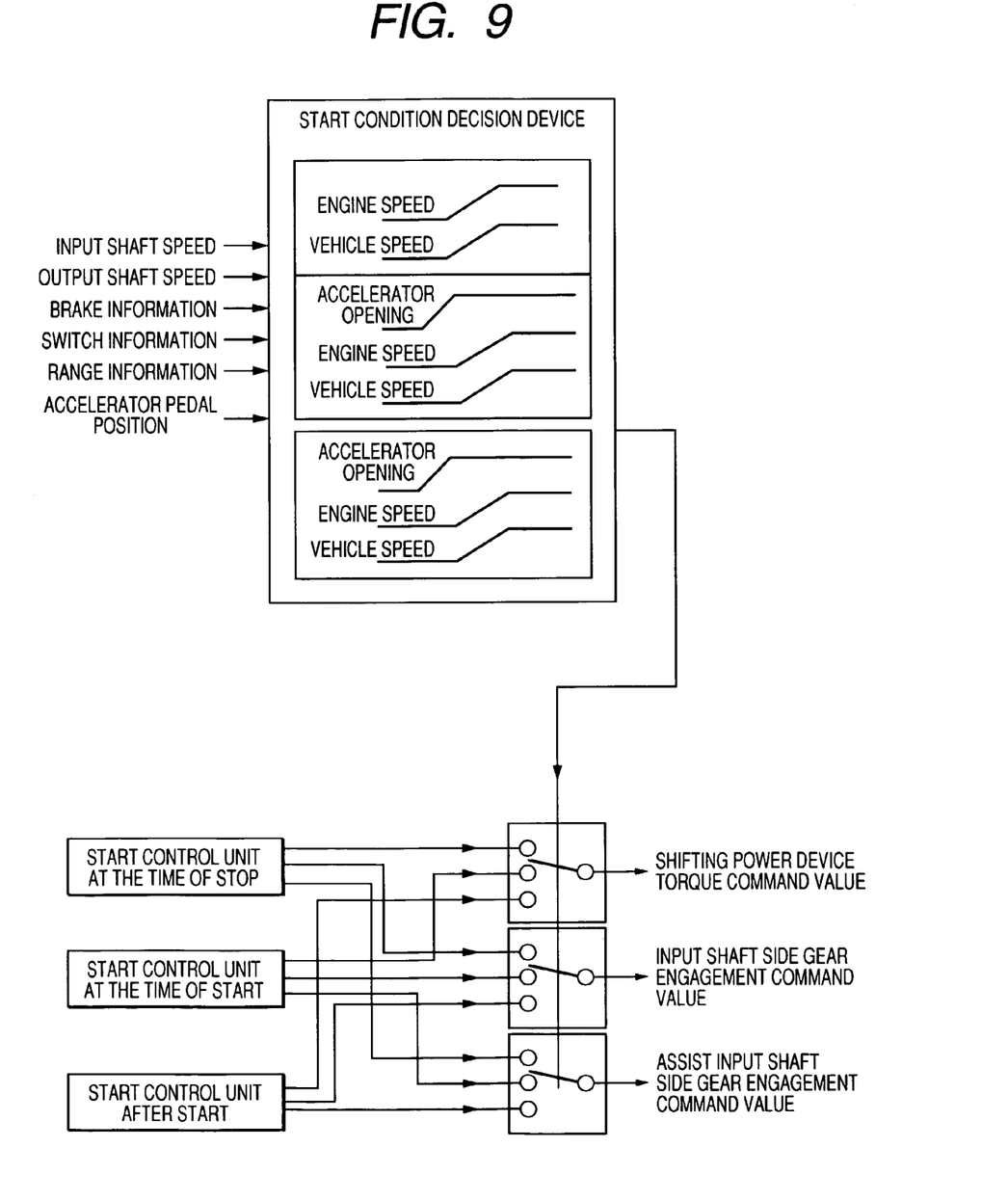
FIG. 9 shows a block diagram of the drive system which is an embodiment of the present invention.

FIG. 9 shows a block diagram of the start control unit which is the control unit of the present invention. From the input shaft speed, output shaft speed, brake information, switch information, range information, and accelerator pedal position, start decision is performed by the aforementioned start condition decision device. By the output of the start condition decision device, the gear engagement instruction value of the input shaft 4, the gear engagement instruction value of the assist input shaft 54, and the torque instruction value to the motor 2 from the start control unit at the time of stop which is the method shown in FIG. 2, the start control unit at the time of start which is the method shown in FIG. 2(b), and the start control unit after start which is the method shown in FIG. 2(c) are switched.

Figure 10:
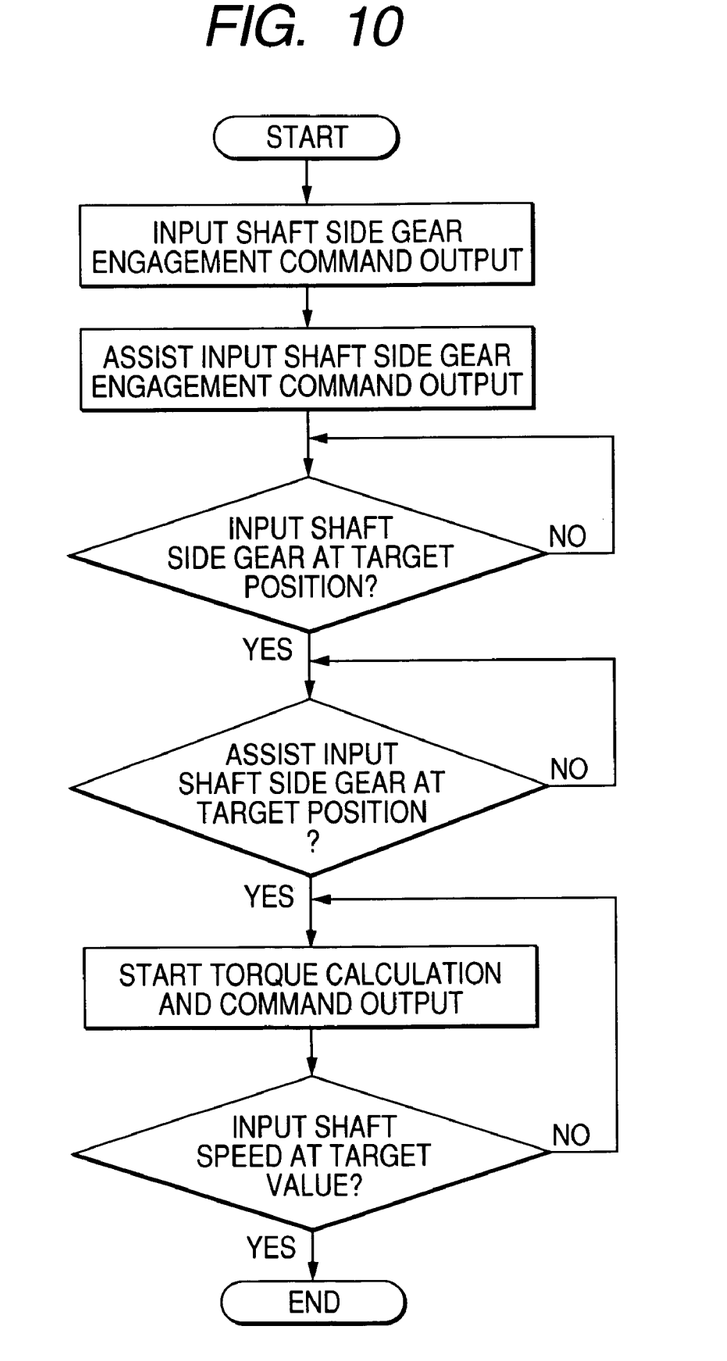
FIG. 10 shows a schematic flow chart of the start device shown in FIG. 9.

FIG. 10 shows a flow chart of the start control unit at the time of stop, the start control unit at the time of start, and the start control unit after start. The processes of the respective units are basically the same and the gear kind to be connected is changed. Further, the start torque requires different calculation formulas, so that they are indicated below.

In the start control unit at the time of stop which is the method shown in FIG. 2(a), the start torque may be a fixed value and although depending on the generating machinery 1, when the value is 50 Nm or more, there is no problem.

In the start control unit at the time of start which is the method shown in FIG. 2(b), feedback control is executed so as to keep the acceleration constant. It can be calculated by the following formula as a simple one.

Start torque=(change rate of output shaft speed−target change rate of number of rotations)×coefficient+preceding start torque Further, by this coefficient or a separately set value, the changed part of the load torque of the generating machinery 1 is added, thus the vehicle can be prevented from vibration.

In the start control unit after start which is the method shown in FIG. 2(c), when the speed is lower than the start vehicle speed of the generating machinery 1, start torque according to the accelerator opening is calculated. Here, the coefficient is only multiplied simply. However, similarly to the start control unit at the time of start, the acceleration may be fed back. When the speed exceeds the start vehicle speed, the generating machinery 1 must be started, so that when an internal combustion engine is used, torque equivalent to the compression torque is added.

<Lower than Start Vehicle Speed>

Start torque=accelerator opening×coefficient

<Start Vehicle Speed or Higher>

Start torque=accelerator opening×coefficient+load torque of generating machinery.

Further, similarly to the start control unit at the time of start, the compression torque is changed in real time, thus the shock or vibration at the time of start can be prevented.

When such calculation results are outputted as torque instruction values, the generating machinery can be started.

Further, the internal combustion engine is described above as a generating machinery 1. However, even if an external combustion engine or a rotary electric appliance is used, such a system is effective. Generally, the rotary electric appliance rotates at a low speed and has high torque, so that it often requires no transmission of a gear switching method. However, although the torque is high, in the neighborhood of zero rotation, the rotary electric appliance does not realize the maximum output. When a gear is used, the smallest number of rotations realizing the maximum output can be reduced more, so that a small-rated rotary electric appliance can respond to it. Therefore, for example, when high torque is required in the stop state on a slope, to output torque corresponding to the maximum output of the rotary electric appliance by using a gear having a large gear ratio, a transmission with a motor is effective. The rotary electric appliance realizes low output in the neighborhood of zero rotation, so that there is a kind of rotary electric appliance which cannot start itself. Therefore, when the generating machinery rotates and rises for starting like the present invention, a rotary electric appliance which cannot start itself can be used. At this time, when the load of the generating machinery 1 is changed at the time of start, the aforementioned torque change and self rotation control are executed according to load changes, thus the vehicle can be prevented naturally from vibration and shock.

Furthermore, in the present invention, it is an object to control the number of rotations of the generating machinery for driving within the movable range, so that in the rotary electric appliance for driving and a generating machinery of another method, to switch the gear during traveling and suppress the number of rotations within the movable range is included within the scope of the present invention. When the movable range of the generating machinery for driving is narrowed, the cost can be reduced and the number of rotations can be prevented from reduction. Concretely, for a generating machinery for generating driving force only within a certain rotation range, when the driving force is extremely reduced at a low rotation, by use of the aforementioned method, the rotation range can be controlled to the self-actuated rotation range by the torque of the motor. The reduction in the driving force at a low rotation is exactly the same as that in the start state mentioned above.

Figure 11:
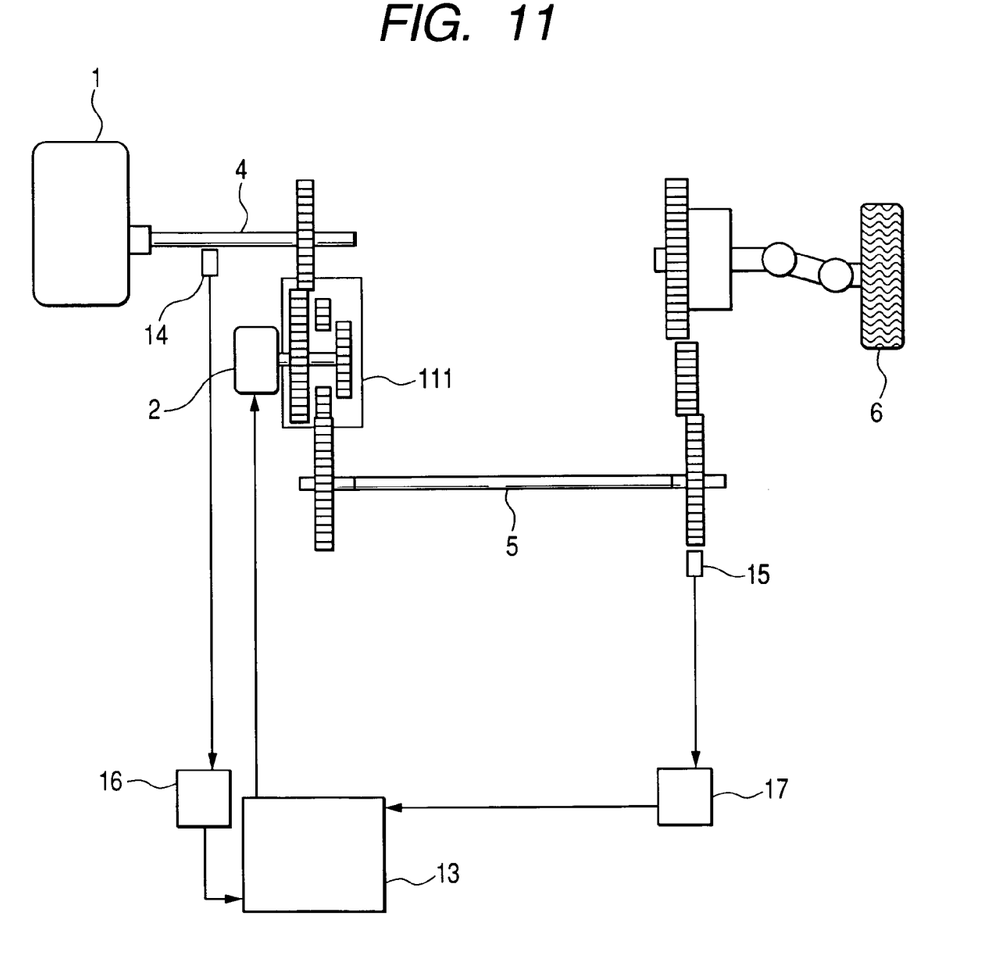
FIG. 11 shows a block diagram of the drive system which is an embodiment of the present invention.

The present invention is described on the premise of the system disclosed in Japanese Patent Application 2002-356124. However, also in the system shown in FIG. 11, using a traveling power device during traveling, the generating machinery can be started. The schematic view of torque transfer shown in FIG. 11 is the same as that shown in FIG. 2(c), so that as mentioned above, the object can be accomplished by changing the torque of the power device.

Further, there is a method available for installing a dedicated starting device in the system described in Japanese Patent Application 2002-356124. In this case, a further effect can be produced for vibration suppression and shock reduction when starting the generating machinery during traveling. The method fulfills the same function as that of a device with a starting generating machinery mounted instead of a generating machinery for driving. However, the constitution is different, so that by use of the present invention, the starting generating machinery can be effectively used for shifting.

As mentioned above, this embodiment starts the generating machinery by using the motor but not using the start dedicated motor. For example, in the automobile transmission, shown in FIG. 1, of Japanese Patent Application 2002-356124 applied earlier by the same applicant, which has an input shaft connected to a generating machinery, an output shaft connected to the wheels, and a shifting gear train arranged in the input shaft and changes the rotational speed by combination of mesh gears, by the force of the motor connected with the shifting gear train, the generating machinery is started.

By doing this, in a frequent stop status at a crossing, the generating machinery can be started. Further, there is no need to install a dedicated motor for the generating machinery, so that the cost can be reduced. Furthermore, since the generating machinery can be started during traveling, reduction in fuel expenses equal to that of a hybrid vehicle can be realized.

As mentioned above, the embodiment of the present invention is an automobile drive control unit which is an automobile transmission comprising a generating machinery, an input shaft side shifting gear train connected to the generating machinery, an output shaft side shifting gear train joined to the input shaft side shifting gear train and fixed to an output shaft connected to the wheels, a dog clutch for engaging or disengaging the input shaft side gear train or the output shaft side gear train from each shaft, a differential device whose one rotational shaft among three shafts is connected to the input shaft, a shifting power device connected to another one rotational shaft among the three shafts of the differential device, a shifting gear train of an assist input shaft joined to the rotational shaft other than the two shafts among the three shafts of the differential device, an output shaft side shifting gear train joined to the assist input shaft side shifting gear train and fixed to the output shaft connected to the wheels, a dog clutch for engaging or disengaging the assist input shaft side gear train or the output shaft side gear train from each shaft, an actuator for engaging and disengaging the dog clutch, an input shaft rotation sensor for observing the input shaft speed, and an output shaft rotation sensor for observing the output shaft speed, wherein the generating machinery is started by the shifting power device.

Further, another embodiment of the present invention is an automobile drive device comprising a generating machinery, an input shaft connected to the generating machinery, a differential device whose one rotational shaft among three shafts is connected to the input shaft, a traveling power device connected to one rotational shaft other than the aforementioned rotational shaft among the three shafts of the differential device, an output shaft connected to the rotational shaft other than the aforementioned two shafts among the three shafts of the differential device for finally driving the wheels, an input shaft rotation sensor for observing the input shaft speed, and an output shaft rotation sensor for observing the output shaft speed, wherein while traveling the vehicle by the traveling power device, the generating machinery is started by the traveling power device.

It is preferable to engage at least two gears of the assist input shaft, fix the output shaft connected to the wheels, and start the generating machinery.

Further, it is preferable to engage one gear of the input shaft and one gear of the assist input gear and while rotating the output shaft connected to the wheels by the shifting power device, start the generating machinery by the shifting power device.

Further, it is preferable to engage only one gear of the assist input gear and while rotating the output shaft connected to the wheels by the shifting power device, start the generating machinery by the shifting power device.

Further, it is preferable to change the generation torque of the shifting power device so as to offset changes of the rotation acceleration of the generating machinery, thereby to keep the change rate of rotation of the output shaft constant.

Further, it is preferable to execute self actuated rotation control of the generating machinery when the rotation acceleration of the rotation shaft of the generating machinery is more than a fixed rotation, thereby prevent the change rate of rotation of the output shaft from sudden change.

Further, it is preferable to install a drive range, a generating machinery start switch, a generating machinery running check sensor, a generating machinery start status detected by the generating machinery running check sensor, a brake pedal position detector, and an accelerator pedal sensor and switch the generating machinery start method.

Further, it is preferable to install a speed detector of the shifting power device, engage one gear of the assist input shaft first, and when the number of rotations of the shifting power source is smaller than a fixed number of rotations, engage the remaining gears.

Reference Numerals used in the drawings show the following parts. 1 . . . Generating machinery for driving, 2 . . . Motor, 4 . . . Input shaft, 5 . . . Output shaft, 6 . . . Wheel, 7 . . . 1-2 shifting dog clutch, 8 . . . 3-4 shifting dog clutch, 9 . . . 5-R shifting dog clutch, 10 . . . 1-2 shifting engaging force generator, 11 . . . 3-4 shifting engaging force generator, 12 . . . 5-R shifting engaging force generator, 13 . . . Start control unit, 14 . . . Input shaft rotation sensor, 15 . . . Output shaft rotation sensor, 16 . . . Input shaft rotation calculator, 17 . . . Output shaft rotation calculator, 54 . . . Assist input shaft, 57 . . . 0.5-1.5 shifting dog clutch, 58 . . . 2.5-3.5 shifting dog clutch, 59 . . . 4.5-0.5R shifting dog clutch, 60 . . . 0.5-1.5 shifting engaging force generator, 61 . . . 2.5-3.5 shifting engaging force generator, 62 . . . 4.5-0.5R shifting engaging force generator, 111 . . . Differential device, 201 . . . Piston, 202 . . . Cone rod, 203 . . . Crank rotation shaft, 300 . . . Rotation stop device, 301 . . . Brake detector, 302 . . . Drive range switching shift lever, 303 . . . Accelerator opening sensor, 304 . . . START switch, 305 . . . Drive range detector

What is claimed is:

1. An automobile control unit comprising;
    an input shaft connected to generating machinery;
    an assist input shaft;
    differential gearing arranged between said input shaft and said assist input shaft;
    a motor connected to said differential gearing;
    an output shaft;
    a first gear train installed between said input shaft and said output shaft, said first gear train having a plurality of dog clutches selectively connectable or openable; and
    a second gear train installed between said assist input shaft and said output shaft, said second gear train having a plurality of dog clutches selectively connectable or openable, such that
    said plurality of dog clutches are connected, said motor is driven, and said generating machinery is started,
    wherein at least two gears of said assist input shaft are connected, and said output shaft connected to wheels is fixed, and said generating machinery is started.

2. An automobile control unit according to claim 1, wherein one gear of said assist input shaft is connected and when the number of rotations of said motor is smaller than a fixed number of rotations, remaining gears are connected.

3. An automobile control unit comprising;
    an input shaft connected to generating machinery;
    an assist input shaft;
    differential gearing arranged between said input shaft and said assist input shaft;

a motor connected to said differential gearing;
an output shaft;
a first gear train installed between said input shaft and said output shaft, said first gear train having a plurality of dog clutches selectively connectable or openable; and
a second gear train installed between said assist input shaft and said output shaft, said second gear train having a plurality of dog clutches selectively connectable or openable, such that
said plurality of dog clutches are connected, said motor is driven, and said generating machinery is started,
one gear of said input shaft and one gear of said assist input shaft are connected and while rotating said output shaft connected to wheels by said motor, said generating machinery is started,
one gear of said assist input shaft is connected and when the number of rotations of said motor is smaller than a fixed number of rotations, remaining gears are connected.

4. An automobile control unit comprising:
an input shaft connected to generating machinery;
an assist input shaft;
differential gearing arranged between said input shaft and said assist input shaft;
a motor connected to said differential gearing;
an output shaft;
a first gear train installed between said input shaft and said output shaft, said first gear train having a plurality of dog clutches selectively connectable or openable; and
a second gear train installed between said assist input shaft and said output shaft, said second gear train having a plurality of dog clutches selectively connectable or openable, such that
said plurality of dog clutches are connected, said motor is driven, and said generating machinery is started,
wherein generation torque of said motor is changed so as to offset changes of a rotation acceleration of said generating machinery, thus a change rate of rotation of said output shaft is kept constant.

5. An automobile control unit comprising;
an input shaft connected to generating machinery;
an assist input shaft;
differential gearing arranged between said input shaft and said assist input shaft;
a motor connected to said differential gearing;
an output shaft;
a first gear train installed between said input shaft and said output shaft, said first gear train having a plurality of dog clutches selectively connectable or openable; and
a second rear train installed between said assist input shaft and said output shaft, said second gear train having a plurality of dog clutches selectively connectable or openable, such that
said plurality of dog clutches are connected, said motor is driven, and said generating machinery is started,
wherein self actuated rotation control is executed by said generating machinery when a rotation acceleration of a rotation shaft of said generating machinery is more than a fixed rotation, thus a change rate of rotation of said output shaft is prevented from sudden change.

6. An automobile control unit comprising;
an input shaft connected to generating machinery;
an assist input shaft;
differential gearing arranged between said input shaft and said assist input shaft;
a motor connected to said differential gearing;
an output shaft;
a first gear train installed between said input shaft and said output shaft, said first gear train having a plurality of dog clutches selectively connectable or openable; and
a second gear train installed between said assist input shaft and said output shaft, said second gear train having a plurality of dog clutches selectively connectable or openable, such that
said plurality of dog clutches are connected, said motor is driven, and said generating machinery is started,
wherein:
said control unit inputs a signal from at least any one of a drive range, a generating machinery start switch, a generating machinery running check sensor, a generating machinery start status detected by said generating machinery running check sensor, a brake pedal position detector, and an accelerator pedal sensor and
according to said signal, switches a method for engaging at least two gears of said assist input shaft, fixing said output shaft connected wheels, and starting said generating machinery, a method for engaging one gear of said input shaft and one gear of said assist input shaft and while rotating said output shaft connected to wheels by said motor, starting said generating machinery, or a method for engaging only one gear of said input shaft and while rotating said output shaft connected to wheels by said motor, starting said prime move.

* * * * *